(12) United States Patent
Stockinger et al.

(10) Patent No.: US 9,190,927 B2
(45) Date of Patent: Nov. 17, 2015

(54) INVERTER WITH A CONNECTOR ELEMENT FORMED BY A CONNECTOR BLOCK AND A CONNECTOR ARRANGED ON ONE SIDE AND A DC BREAKING ELEMENT ARRANGED INBETWEEN

(75) Inventors: Walter Stockinger, Nussbach (AT); Michael Humer, Prambachkirchen (AT); Slavica Pestic, Traun (AT); Markus Wolfschluckner, Neukirchen am Walde (AT)

(73) Assignee: Fronius International GmbH, Pettenbach (AT)

( * ) Notice: Subject to any disclaimer, the term of this patent is extended or adjusted under 35 U.S.C. 154(b) by 228 days.

(21) Appl. No.: 13/823,870

(22) PCT Filed: Sep. 30, 2011

(86) PCT No.: PCT/AT2011/000405
§ 371 (c)(1),
(2), (4) Date: Mar. 15, 2013

(87) PCT Pub. No.: WO2012/040761
PCT Pub. Date: Apr. 5, 2012

(65) Prior Publication Data
US 2013/0170271 A1 Jul. 4, 2013

(30) Foreign Application Priority Data
Sep. 30, 2010 (AT) .................................. A 1639/2010

(51) Int. Cl.
*H02M 1/20* (2006.01)
*H02M 7/00* (2006.01)

(52) U.S. Cl.
CPC ..................................... *H02M 7/003* (2013.01)

(58) Field of Classification Search
CPC .......... H02M 7/003; H02M 7/00; H01R 13/70
USPC ................... 363/146; 361/837; 307/326–328; 439/94, 188
See application file for complete search history.

(56) References Cited

U.S. PATENT DOCUMENTS 4,691,978 A * 9/1987 Lemmer .................. 439/620.09
6,433,445 B1 * 8/2002 Ahladas et al. ............... 307/117
(Continued)

FOREIGN PATENT DOCUMENTS

DE   10 2005 061 532   7/2007
DE   20 2007 002 077   4/2008
(Continued)

OTHER PUBLICATIONS

International Search Report of PCT/AT2011/000405, Feb. 9, 2012.
(Continued)

*Primary Examiner* — Gary L Laxton
*Assistant Examiner* — Kyle J Moody
(74) *Attorney, Agent, or Firm* — Collard & Roe, P.C.

(57) ABSTRACT

An inverter with a connector element has a fixture with a connector element arranged thereupon and an electronic part which can be plugged into the connector element, together forming the inverter. The connector element is formed by a connector block for connecting at least one solar module, and at least one connector for the electronic part, wherein corresponding connector sockets for pluggably connecting to the connectors are arranged on the electronic part, and the inverter is formed by a DC breaking element. To allow solar modules to be separated easily, the connector element is composed of an assembly wherein the connector block and the connector are arranged at least on one side and a DC breaking element is arranged between them. An actuation element of the DC breaking element is arranged outside the assembly to mechanically or electronically activate and deactivate the connection between the connector block and the connector.

4 Claims, 3 Drawing Sheets

(56) References Cited

U.S. PATENT DOCUMENTS

| | | | |
|---|---|---|---|
| 6,593,520 B2* | 7/2003 | Kondo et al. | 136/244 |
| 8,859,884 B2* | 10/2014 | Dunton et al. | 136/251 |
| 2004/0147172 A1* | 7/2004 | Brown et al. | 439/701 |
| 2006/0077599 A1 | 4/2006 | Laschinksi et al. | |
| 2008/0084645 A1* | 4/2008 | Ahmad, Jr. | 361/103 |
| 2009/0114263 A1* | 5/2009 | Powell et al. | 136/244 |
| 2010/0001587 A1* | 1/2010 | Casey et al. | 307/80 |
| 2011/0194216 A1 | 8/2011 | Schaub et al. | |
| 2011/0253193 A1* | 10/2011 | Korman et al. | 136/245 |
| 2011/0294336 A1 | 12/2011 | Stockinger et al. | |
| 2012/0007657 A1 | 1/2012 | Naumann et al. | |

FOREIGN PATENT DOCUMENTS

| | | |
|---|---|---|
| DE | 10 2008 029 491 | 12/2009 |
| DE | 10 2008 050 543 | 4/2010 |
| DE | 20 2009 004 198 | 8/2010 |
| WO | WO 2007/048421 | 5/2007 |
| WO | WO 2010/091445 | 8/2010 |

OTHER PUBLICATIONS

Austrian Search Report dated Aug. 18, 2011 in Austrian Application No. A 1639/2010 with English translation of relevant parts.

* cited by examiner

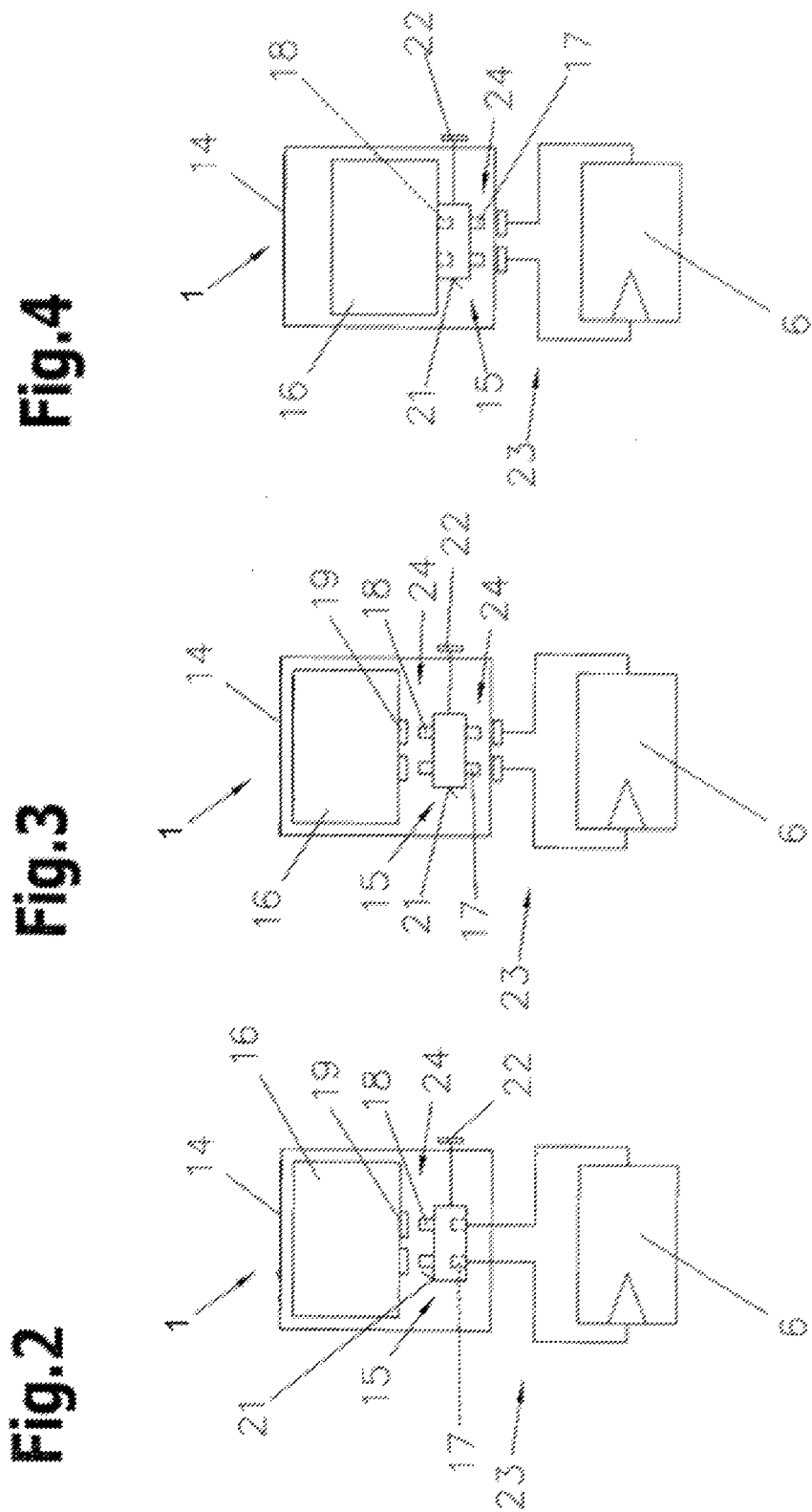

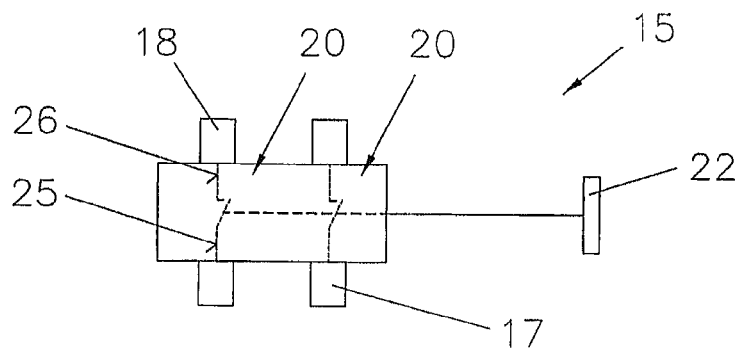
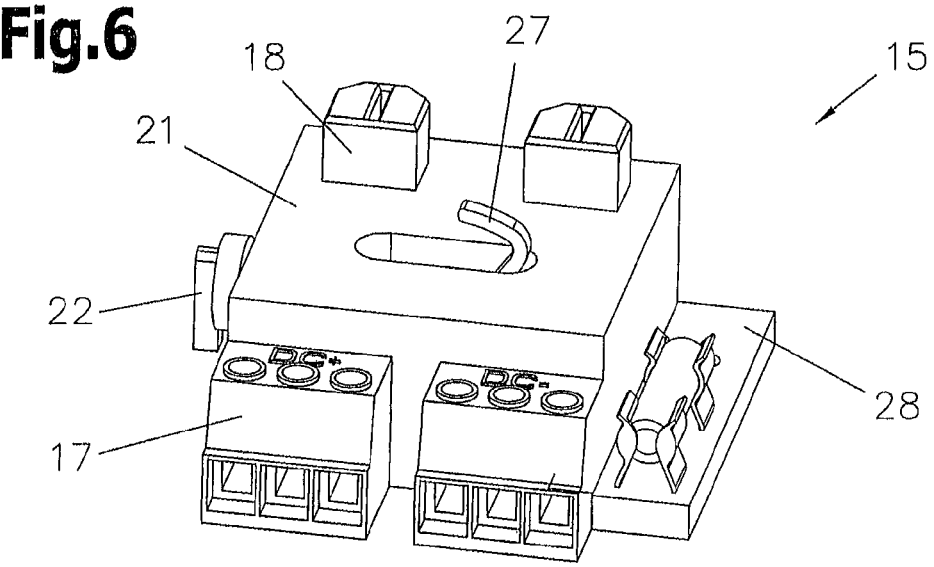
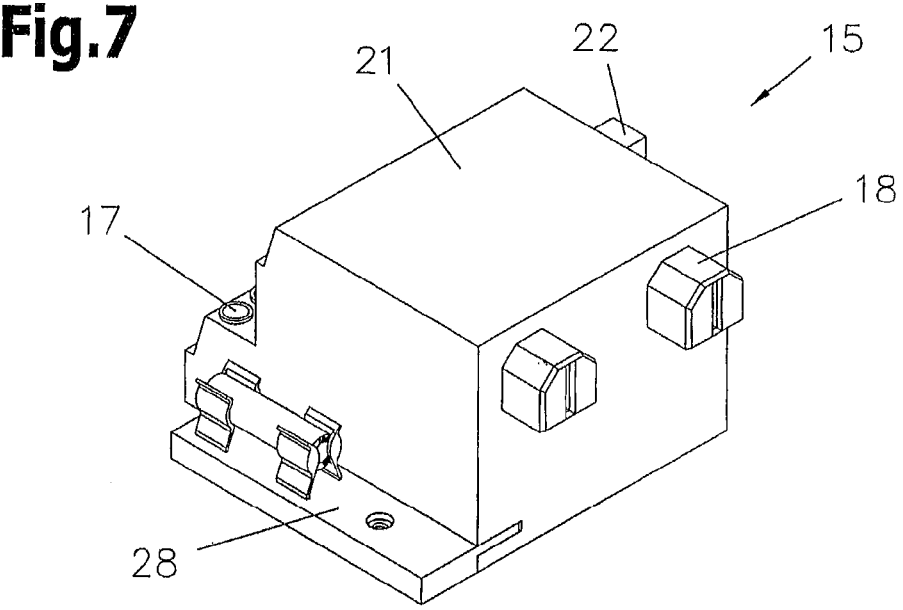

INVERTER WITH A CONNECTOR ELEMENT FORMED BY A CONNECTOR BLOCK AND A CONNECTOR ARRANGED ON ONE SIDE AND A DC BREAKING ELEMENT ARRANGED INBETWEEN

CROSS REFERENCE TO RELATED APPLICATIONS

This application is the National Stage of PCT/AT2011/000405 filed on Sep. 30, 2011, which claims priority under 35 U.S.C. §119 of Austrian Application No. A 1639/2010 filed on Sep. 30, 2010, the disclosures of which are incorporated by reference. The international application under PCT article 21(2) was not published in English.

The invention relates to an inverter with a connector element, comprising a fixture with a connector element arranged thereupon and an electronic part which can be plugged into said connector element, together forming said inverter, the connector element comprising a connector block for connecting at least one solar module, and at least one connector for the electronic part, wherein corresponding connector sockets for pluggably connecting to the connectors are arranged on the electronic part, and said converter also comprising a DC breaking element.

An inverter is used to convert the direct voltage of a power source or solar modules, respectively, into a sinusoidal alternating voltage, which can be supplied into an electric grid or can directly be used to supply consumer loads. For this purpose inverters are known, comprising a fixture with a connector element arranged thereupon and an electronic part which can be plugged into said connector element, together forming the so-called pluggable inverter. The connector element comprises connector blocks for connecting at least one solar module, and at least one connector for the electronic part. Corresponding connector sockets for pluggably connecting to the connectors are arranged on the electronic part. Furthermore, the inverter comprises a DC breaking element assigned to the electronic part.

In order to particularly reduce line losses, ever-increasing input DC voltages, for example of up to 1500 volt and above, are applied by connecting a correspondingly high number of photovoltaic modules in series.

During maintenance work on photovoltaic plants it is required to separate the inverter at least from the DC voltage side—meaning the input on the fixture—so that the work can be carried out on a de-energized electronic part or the electronic part can be removed from the fixture. Usually, the break, carried out manually by the operator, is performed when the supply lines of the DC voltage side carry current so that powerful DC breaking elements are required for the break.

Such a DC breaking element is arranged in the transition zone between the connector sockets on the electronic part and the functional units of the power element arranged therein, such as a DC-DC converter, a DC-AC converter, etc., and is usually wired manually via connecting lines dimensioned accordingly. By plugging or connecting the electronic part to the fixture, the connectors in the fixture are connected to the connector sockets on the electronic part so that the power delivered from the solar modules is supplied to the DC breaking element and to the functional units within the electronic part connected thereto via the connector sockets. By actuating, that means deactivation of the DC breaking element, the electronic part is disconnected and appropriate maintenance work can be conducted or the electronic part can be removed from fixture.

It is disadvantageous that in such a pluggable inverter comprising of two parts the DC breaking element is arranged within the electronic part. Thus, by deactivation of the DC breaking element, the individual components—such as the power element—can though be disconnected; however, by separating fixture and electronic part the voltage generated by the solar modules still applies on the electric connection between interconnecting connectors and connector sockets.

It is also disadvantageous that each of the connection lines is connected to the DC voltage side and the electronic part on terminal strips or the like. For example, a connector element can be used, which has at least one connector block for the DC voltage side and is formed with connectors for the electronic part. The connector block is mostly formed as a plug or a plug socket, wherein the supply lines of the photovoltaic plant also have a plug or plug socket. The connector for the electronic part can also be formed as a plug or a plug socket. A plurality of contact points up to the power element is resulting from said external and internal connection lines within the device and from the transitions between plug(s) and plug socket(s), each of which presents a transition resistance and, thus, causes losses.

The object of the present invention is to reduce the contact points by using a DC breaking element in a pluggable inverter.

The present object is solved by an inverter mentioned above, in which the connector element is composed of an assembly, wherein the connector block and the at least one connector for pluggably connecting to the electronic part are arranged on at least one side of the connector block and at least one DC breaking element is arranged between them, and, furthermore, an actuation element of the DC breaking element is arranged outside the assembly to mechanically or electronically activate and deactive the connection between the connector block and the at least one connector.

It is advantageous that the plug-in connection to the electronic part is already de-energized when separating the electronic part. This also results in less required space so that the overall size of the inverter is minimized. Similarly, no effort for assembling and wiring is required for the DC breaking elements, whereby wiring errors can be excluded and process stability in manufacturing is increased. Another advantage is the reduction of contact points and transition resistances, whereby line losses can be avoided or reduced, respectively. In addition, expenses for cables are also reduced, which otherwise would be necessary for wiring.

Due to the measures, that a first contact of the DC breaking element is formed as a contact point of the connector block, a second contact of the breaking element is formed as a contact point of the at least one connector and the contact points are arranged such that the distance of the contact points is adjusted to the overall size of the breaking elements, the overall size of the housing of the connector element can advantageously be kept to minimum.

Advantageously, at least the actuation element of the DC breaking element is arranged laterally and at the bottom of the assembly, if need be.

It is another advantage, that the at least one connector and/or connector block is formed by a first portion of a plug-in connection, whereby fixture and inverter can be assembled separately and are independent from each other. In addition, a simple pluggable assembly of the supply lines to the connector block is for example achieved by commercially available multi-contact plugs.

When the actuation element is coupled to the plug-in connection by an interlocking mechanism, it can be achieved that the plug-in connection can only be separated when the actuation element is in an off position.

The actuation element is preferably arranged and formed on an outside wall of the inverter to be operated from outside.

The present invention is explained in more detail with the help of the attached schematic drawings. In which:

FIG. 2 is a first schematic embodiment of the arrangement of the present connector element within the inverter;

FIG. 3 is a second schematic embodiment of the arrangement of the present connector element within the inverter;

FIG. 4 is a third schematic embodiment of the arrangement of the present connector element within the inverter;

FIG. 5 is a detailed schematic illustration of the connector element;

FIG. 6 is a first schematic three-dimensional illustration of an embodiment of the connector element; and FIG. 7 is a second schematic three-dimensional illustration of an embodiment of the connector element.

Introductorily, it is noted that same parts of the embodiment are denoted with same reference characters.

Figure 1:
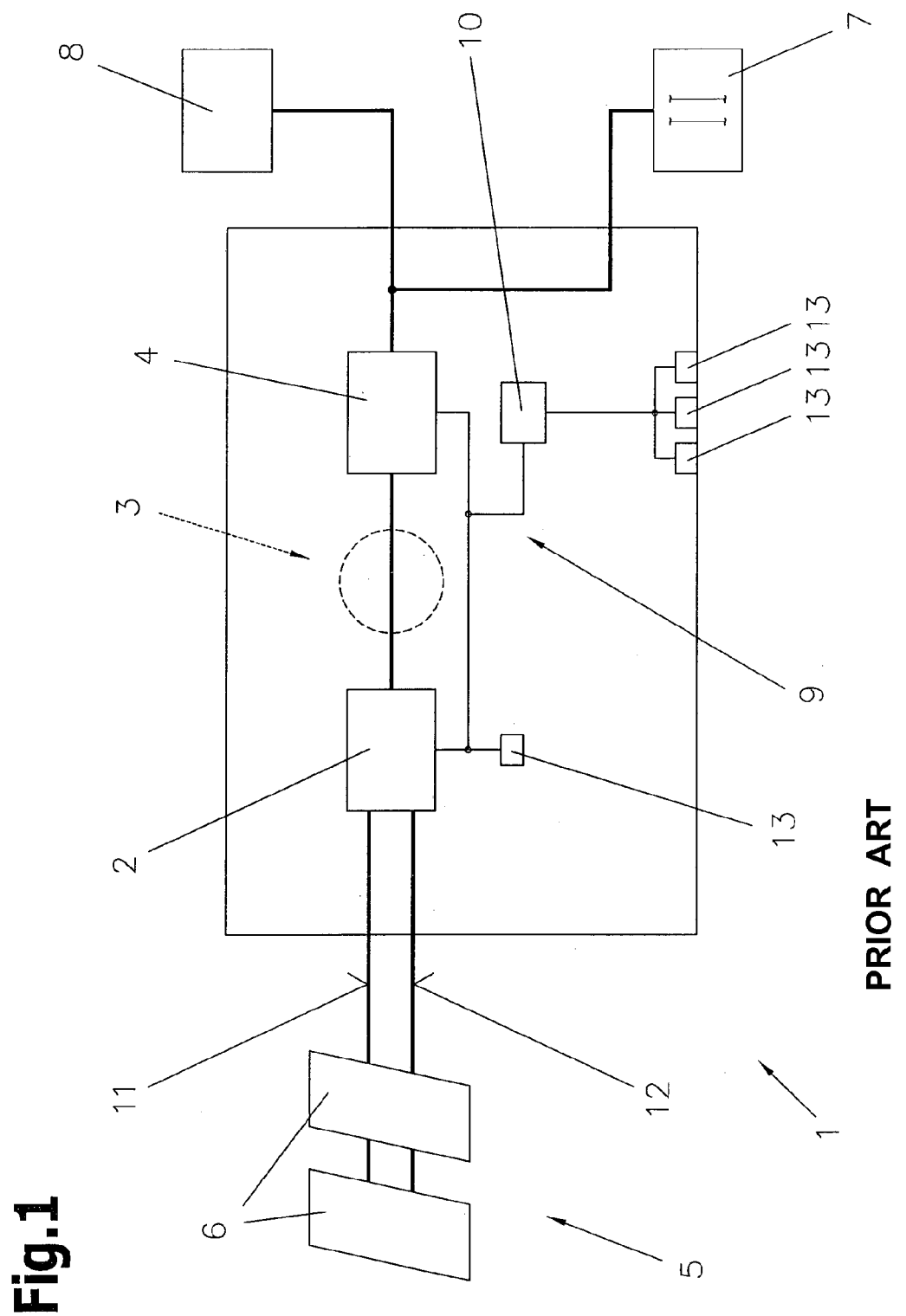
FIG. 1 is a schematic overview of an inverter of a photovoltaic plant.

In FIG. 1 a configuration of a known inverter 1, in the details of a HF inverter, is shown. Since the individual components or assemblies and functions of inverters 1 are already known from prior art, they will not be explained in detail in the following.

The inverter 1 has at least one input DC-DC converter 2, an intermediate circuit 3 and an output DC-AC converter 4. A power source 5 is connected to the input DC-DC converter 2, which is preferably composed of one or more photovoltaic modules 6 connected in parallel and/or in series. The inverter 1 and the photovoltaic modules 6 are also referred to as a photovoltaic plant or a PV plant. The output of the inverter 1 or the output DC-AC-converter 4, respectively, can be connected to an electric grid 7, such as a public, private AC voltage grid, or a multiple-stage grid, and/or can be connected to at least one electrical consumer load 8. For example, a consumer load 8 is composed of an engine, refrigerator, radio unit, etc. The consumer load 8 can also be a home power supply. The individual components of the inverter 1 can be connected to a control device 10 via a data bus 9.

Preferably, such an inverter 1 is used as a so-called grid-connected inverter 1, the power management of which is optimized to supply as much power into the grid 7 as possible. As known from prior art consumer loads 8 are supplied via the grid 7. Of course several inverters 1 connected in parallel can also be employed. Thus, more power for the operation of consumer loads 8 can be provided.

Said power is supplied from power source 5 or photovoltaic modules 6 in the form of a direct voltage connected to the inverter 1 via two connection lines 11, 12.

Control device 10 of inverter 1 is for example composed of a microprocessor, a microcontroller or a data processor. An appropriate control of the individual components of the inverter 1, such as the input DC-DC converter 2 or the output DC-AC converter 4, particularly the switching elements arranged therein, can be performed via control device 10. Therefore the individual control processes are stored in the control device 10 by appropriate software programs and/or data or characteristic curves.

Furthermore, operating elements 13 are connected to control device 10, by which the user can for example configure inverter 1 and/or display—for example by light emitting diodes—and adjust operating conditions or parameters. The operating elements 13 are for example connected to control device 10 directly or via data bus 9. Such operating elements 13 are for example arranged on a front face of the inverter 1 so that an operation from the outside is possible. The operating elements 13 can also directly be arranged to assemblies and/or modules within the inverter 1.

The inverter 1 can comprise a fixture 14 with a connector element 15 arranged thereupon and an electronic part 16 which can be plugged into said connector element, together forming the so-called pluggable inverter 1.

Such an inverter 1 is hereinafter described in detail in the synopsis of FIGS. 2 to 7.

The connector element 15 comprises at least one connector block 17 to connect at least one solar module 6, and at least one connector 18 for the electronic part 16. Corresponding connector sockets 19 for pluggably connecting to the connectors 18 are arranged on the electronic part 16. Furthermore, the inverter 1 comprises a DC breaking element 20, which is assigned to the electronic part 16. Such a DC breaking element 20 is arranged in the transition zone between the connector sockets 19 on the electronic part and the functional units of the power element arranged therein, such as for example the DC-DC converter, the DC-AC converter, etc.

According to the invention it is intended to reduce the losses and contact points by arranging at least one DC breaking element 20 in one assembly 21 of the connector element 15. Accordingly, the connector element 15 is composed of an assembly 21, in which the connector block 17 and the at least one connector 18 for pluggably connecting to the electronic part 15 are arranged at least on one side and at least one DC breaking element 20 is arranged between them, and an actuation element 22 of the DC breaking element 20 is arranged outside the assembly 21 to mechanically or electronically activate and deactivate the connection between connector block 17 and connector 18. Thus, the contacts of the DC breaking element 20 are substantially directly connected to the supply lines 23 of the direct voltage side and to the electronic part 16. The connector element 15 is also composed of an assembly 21, in which the connector block 17, the DC breaking elements 20 and the connectors 18 are incorporated and the connectors 18 for pluggably connecting to the connector sockets 19 are formed.

Thus, assembling the electrical and mechanical components of the DC breaking element 20 and the connector section of the solar modules 6 to form the further functional units of inverter 1 is enabled.

As can be seen from the variants described in the following, the DC breaking elements 20 are incorporated in the assembly 21, wherein at least the input contacts for the supply lines 23 of the direct voltage side are formed as a detachable connection. That means that the supply lines 23 on the connector blocks 17 are for example screwed together and/or plugged in. Even so-called spring-type terminals could be used. In order to plug-in supply lines 23, the connector blocks 17 are formed as a first part of a plug-in connection 24, and the supply lines 23 are for example provided with standard plug-in/socket elements. Said contact point for the detachable connection is directly incorporated in a first contact 25 of the DC breaking element 20 or the first contact 25 is formed as a contact point, respectively, so that only one contact point is resulting and no connection lines are required.

The connector element 15 also has at least one contact point on the side of the electronic part 16, which is formed as a connector 18 for the functional units of the electronic part—such as the power element. The contact point is incorporated in a second contact 26 of the DC breaking element 20 or the second contact 26 is formed as a contact point, respectively.

At least one contact point is either directly connected to a circuit board of the electronic part 16 or formed as a plug-in connection 24.

Thus, the contact points that are for example arranged opposite to each other are substantially part of the DC breaking element 20. Accordingly, the contact points are arranged on the edge sections of assembly 21 so that supply lines 23 and discharge lines—substantially to electronic part 16—can be connected to the contact points. Thus, the DC breaking elements 20 are substantially arranged in the center of the assembly 21, the assembly 21 also comprising the contact points due to projections and/or elevation on the edge sections.

In a direct connection of the contact point to the circuit board the connector element 15 is fully incorporated in the electronic part 16, since for example the second contacts 26 of the DC breaking elements 20 are soldered or screwed together. Thus, the soldered joint or screw joint 24 forms the contact point. Accordingly, the second contacts 26, which are designed as connectors 18, are led through the assembly 21. Nevertheless, the electronic part 16 is pluggably formed, when the connector block 17 is formed as a plug-in connection 24. Accordingly, a first part of the plug-in connection 24 is arranged in the assembly 21 and the second part of the plug-in connection 24 is arranged on the fixture 14. Thus, the electronic part 16 is secured to the fixture 14 with the connector element 15.

Accordingly, in the embodiment as a plug-in connection 24 a first part of plug-in connection 24, for example the coupling, is incorporated in the assembly 21 of the connector element 15. Accordingly, the coupling serves as a contact point and is for example arranged as a projection on the edge of the assembly 21. The connector element 15 is for example secured on a fixture 14 of the inverter 1. Accordingly, the second part of the plug-in connection 24 is incorporated in the electronic part 16. Thus, the plug-in connection 24 is contacted when the electronic part 16 is secured to the fixture 14. In detail, such a plug-in connection 24 can be found in WO 2010/091445 A1.

Thus, the electronic part 16 can be plugged into the connector element 15, which is secured to fixture 14, wherein the electronic part 16 is simultaneously secured to fixture 14.

The electronic part 16 can also be secured first so that the connector element 15 is secured thereto. The connector element 15 is adapted to the design of fixture 14 and electronic part 16. Accordingly, the connector block 17 and the at least one connector 18 as well as the contact points thereof are arranged on the respective side of assembly 21 of the connector element 15. That means either on the same side, on opposite sides or on a front face and on an upper or a lower side.

Since the contact points and the DC breaking elements 20 are incorporated in the assembly 21 of the connector element 15, the contact points substantially correspond to the contacts of the DC breaking elements 20. It can also be said that the contact points are incorporated in the contacts and are accordingly arranged on the free end of the contacts. Thus, the contacts of DC breaking elements 20 are formed in an enlarged way or are adapted to the dimensions of the assembly 21 of the connector element 15 so that the contacts are led to the edge of the assembly 21 without transitions and interruptions. Contacts are designed and contact points are formed accordingly. That means that the contact points for the supply lines 23 are for example formed as a connector, wherein the connectors are incorporated in the connector block 17 and the connectors 18 for the electronic part are formed as a coupler plug so that a first part of the plug-in connection 24 is designed for both the connector block 17 and the connectors 18.

The actuation of the DC breaking elements 20 is preferably performed via an actuation element 22 arranged on the outside of the assembly 21 of the connector element 15. As seen, the actuation element 22 is for example arranged laterally, wherein a single actuation element 22 can switch all DC breaking elements 20 by a mechanically actuated shaft. The actuation element 22 is for example arranged on the shaft as a press button, a lever or a rotary switch so that it can be switched between an on-position and an off-position.

Preferably, the actuation element 22 can be actuated from outside the housing of inverter 1. Accordingly, the connector element 15 is for example positioned on the edge of the housing of the inverter 1 so that the actuation element 22 can be actuated through a corresponding opening in the housing of inverter 1.

Of course the actuation element 22 can also be formed electrically, for example with a relay, wherein the actuation element 22 is composed of a push-button, switch or an integrated circuit. Here, respective contacts are led through the assembly 21, which are connected to the actuation element 22 and/or to a communication interface. Thus, the push-button is for example incorporated in the housing of the inverter so that the operation from outside is possible.

The communication interface enables a remote access to the actuation element 22, for example via the Internet. Thus, the electronic part 16 can simply be switched on and off remotely, for example while work is performed on the electric grid. Accordingly, no person needs to be on site.

With the actuation of the actuation element 22 also an interlock of the plug-in connection 24 can additionally be carried out so that the assembly 21 can only be detached when the actuation element is in the off position. Said interlock is for example carried out by mechanical components, which are arranged outside the assembly 21 of the connector element 15 and form the interlocking mechanism and interlock or detach, respectively, the second part of the plug-in connection 24 accordingly. Thus, the actuation element 22 is coupled with the plug-in connection 24 through the interlocking mechanism. For example in such a way that a lever 27 is moved as an interlocking mechanism together with the actuation element 22 and preferably engages a recess in the second part of the plug-in connection 24 on both sides of assembly 21. The lever 27 can—as shown—also be arranged at the top so that the interlock is substantially carried out by the recess arranged in the center of the plug-in connection 24.

With such a tight structure of the connector element 15, said element can be supplemented by additional components, which are required for country-specific standards. Therefore plug-in and/or contact points are provided on the assembly so that for example protective groundings 28, overvoltage suppressors or soft groundings can be added and thereby the assembly 21 is extended. Accordingly, they are directly connected to at least one contact point.

Of course the connector element 15 may also comprise connectors 18 and connector blocks 17 for output lines that means for connecting to the AC voltage grid. Here, breaking elements can also be arranged, if need be, which are converted together with the DC breaking elements 20 of the input lines. The connector element 15 may also be configured for data transmission or the like other than for power transmission.

In general it can be said that the number of connector blocks 17, connectors 18 and DC breaking elements 20 is adapted to the capacity of inverter 1 and to the configuration of the photovoltaic plant. This results in the required number of supply lines 23. The number of DC breaking elements 20 substantially matches the number of supply lines 23, wherein one common DC breaking element 20 can be used for several supply lines 23.

The invention claimed is:

1. An inverter comprising:
    a fixture;
    an assembly comprising a connector element arranged upon the fixture;
    an electronic part which can be plugged into said connector element, the connector element comprising a connector block incorporated in a first side of the assembly for connecting to at least one solar module, at least one connector incorporated in a second side of the assembly for the electronic part, and a DC breaking element incorporated in the assembly between the first side and the second side;
    corresponding connector sockets for pluggably connecting to the at least one connector and arranged on the electronic part; and
    an actuation element of the DC breaking element arranged outside the assembly to mechanically and electronically activate and deactivate the connection between the connector block and the at least one connector;
    wherein a first contact of the DC breaking element is directly formed as a contact point of the connector block and a second contact of the DC breaking element is directly formed as a contact point of the at least one connector;
    wherein
    the at least one connector is formed as a pluggable connection to the electronic part; or
    the connector block for connecting to the at least one solar module is formed by a first part of a plug-in connection; and
    wherein the actuation element is coupled to the plug-in connection by an interlocking mechanism.

2. The inverter according to claim 1, wherein the actuation element of the DC breaking element is arranged on an exterior side of the assembly lateral to the first side and the second side.

3. The inverter according to claim 1, wherein the actuation element of the DC breaking element is arranged at the first side of the assembly.

4. The inverter according to claim 1, wherein the actuation element is arranged and formed on an outside wall of the inverter.

* * * * *